United States Patent [19]

Zerpner et al.

[11] Patent Number: 4,950,826
[45] Date of Patent: Aug. 21, 1990

[54] PROCESS FOR ADJUSTING THE CIS-TRANS-DOUBLE BOND CONFIGURATION IN POLYALKENAMERS

[75] Inventors: Dieter Zerpner; Roland Streck, both of Marl, Fed. Rep. of Germany

[73] Assignee: Huels Aktiengesellschaft, Marl, Fed. Rep. of Germany

[21] Appl. No.: 899,452

[22] Filed: Aug. 22, 1986

[30] Foreign Application Priority Data

Aug. 22, 1985 [DE] Fed. Rep. of Germany ....... 3529996

[51] Int. Cl.$^5$ .............................................. C08F 32/06
[52] U.S. Cl. ..................... 585/353; 585/507; 526/142; 526/169; 526/281; 526/308; 525/267; 525/269
[58] Field of Search ................ 526/281, 308; 585/353, 585/507

[56] References Cited

U.S. PATENT DOCUMENTS

| | | | |
|---|---|---|---|
| 3,714,138 | 1/1973 | Cook | 526/308 |
| 3,816,382 | 6/1974 | Streck et al. | 526/308 |
| 4,138,448 | 2/1979 | Minchak | 526/169 |
| 4,262,103 | 4/1981 | Minchak | 526/281 |

OTHER PUBLICATIONS

Von Roland Streck, Die Olefin–Metathese, etc., Chemiker Zeitung, Sonderdruck 99(1975) 397–413, pp. 1–2.
K. J. Ivin, Olefin Metathesis, Academic Press 1983, pp. 1, 13, 14, 25, title.
V. Dragutan et al, Olefin Metathesis & Ring-Opening Polymerization of Cyclo-Olefins, John Wiley & Sons, (1985) 4 pages.
Streck, Roland; Olefin Metathesis, a Multifaceted Tool of Petrochemistry and Polymer Chemistry; pp. 1–5.

*Primary Examiner*—Edward J. Smith
*Attorney, Agent, or Firm*—Millen, White & Zelano

[57] ABSTRACT

Process for adjusting the cis-trans-double bond configuration in polyalkenamers produced by ring-opening polymerization of cis,cis-1,5-cyclooctadiene or 2-norbornene wherein the polymerization is performed in the presence of isoprene and/or a cyclic olefin with a double-bond pair in the 1,3-position.

14 Claims, No Drawings

PROCESS FOR ADJUSTING THE CIS-TRANS-DOUBLE BOND CONFIGURATION IN POLYALKENAMERS

BACKGROUND OF THE INVENTION

This invention relates to a process for adjusting the cis-trans double bond configuration in polyalkenamers produced by ring-opening polymerization.

Cyclic olefins having at least one unsubstituted ring double bond can be conventionally polymerized with the aid of so-called metathetic catalysts with ring opening (DOS's Nos. 1,570,940; 1,645,038; 1,720,798; 1,770,143; and 1,805,158; DAS No. 1,299,868; British Patent Nos. 1,124,456; 1,194,013; and 1,182,975).

It is furthermore known that open-chain monoolefins act as molecular weight modifiers in the presence of the metathetic catalysts during the polymerization of cycloolefins (DOS No. 2,922,335 and German Patent Nos. 1,919,047; 1,945,358; 2,027,905; 2,028,716; 2,028,935; 2,105,161; and 2,157,405), and as degrading agents on polymers the main chain of which contains unsubstituted double bonds (DOS No. 1,929,140 and U.S. Pat. No. 3,558,589).

Normally, the double bonds in the products (polyalkenamers) obtained by ring-opening polymerization—optionally with addition of a molecular weight modifier—are predominantly of the transconfiguration. Thereby the thermoplastic character predominates, rather than the frequently desired elastomeric character.

SUMMARY OF THE INVENTION

It is an object of this invention to produce high-molecular weight range polyalkenamers having reduced crystallization tendency and improved low-temperature characteristics. It is another object to produce low-molecular weight range polyalkenamers which are readily fluid oils. Such products are distinguished, as is known, by a reduced trans content and thus a higher cis content of the double bonds present in the polymer. It is a further object to produce the desired polalkenamers in satisfactory yields.

Upon further study of the specification and appended claims, further objects and advantages of this invention will become apparent to those skilled in the art.

This invention relates to a process for adjusting the cis- trans double bond configuration (i.e., vis-a-vis the prior art increasing the ratio of cis- to trans-) in polyalkenamers produced by ring-opening polymerization, e.g., of cis,cis-1,5- cyclooctadiene or 2-norbornene, comprising the step of:

conducting the polymerization in the presence of isoprene and/or a cyclic olefin with a double bond pair in the 1,3-position.

This result is surprising inasmuch as the reaction is greatly impeded by the addition of open-chain and cyclic 1,3-dienes during ring-opening polymerization of certain cycloolefins, manifesting itself by a strong reduction in yield.

Isoprene is suitable as the open-chain 1,3-diene. In the case of cyclic 1,3-dienes, compounds with 5–12 carbon atoms in the ring, such as 1,3-cyclohexadiene, 1,3-cyclooctadiene and 1,3-cyclododecadiene are suitable. Also suitable are cyclic compounds having more than two double bonds in the ring, such as 1,3,5-cycloheptatriene or 1,3,5,7-cyclooctatetraene.

Suitable amounts of isoprene and the other compounds with double bonds in the 1,3-position to be utilized according to this invention are 0.1–150 mol-%, preferably 3-100 mol-%, based on the amount of cis,cis-1,5-cyclooctadiene or 2-norbornene used. This condition also applies when cis,cis-1,5-cyclooctadiene or 2-norbornene is partially replaced by other cyclic monoolefins.

Cyclic olefins polymerizable within the scope of the process of this invention are cis,cis-1,5-cyclooctadiene and 2-norbornene, both of which are industrially available. Both cyclic olefins can be polymerized individually as well as in admixture with each other or with cyclic monoolefins of 7-12 carbon atoms. The cyclic monoolefins can be added, in this connection, in amounts of up to 80 mol-%, preferably up to 60 mol-% of the total monomer charge. Suitable cyclic monoolefins are, for example, cycloheptene, cyclooctene and cyclododecene. Cyclooctene is utilized with preference as the comonomer.

During the copolymerization, the individual cycloolefins can be polymerized not only in admixture but also in succession. This statement applies only to the two cycloolefins: cis,cis-1,5-cyclooctadiene and 2-norbornene. As for the cyclic monoolefins usable as comonomer, the conditions are set out further below in greater detail.

The process of this invention can be performed with all catalysts suited for ring-opening polymerization. These, as is known, contain compounds of metals of Subgroups 5-7 of the Periodic Table of the Elements, primarily those of niobium, tantalum, molybdenum, tungsten, and rhenium, as well as metals of Main Groups 1-4 and/or their alkyls or hydrides, optionally with additional ligands, such as, for example, halogen, alkoxy or carboxylate, or Lewis acids in their place. Besides they can contain further activating additives, such as, for example, alcohols, epoxides, hydroperoxides, vinyl ethers and esters, allyl ethers and esters, vinyl halides, and aromatic nitro compounds.

In the preparation of products of the same molecular weight, an increase in the addition of 1,3-diolefins according to this invention leads to a progressive reduction of double bonds with trans configuration, i.e., there is a continuous decrease in the viscosity of the products. This provides a ready means for the mentioned cis content adjustment. For example, within the scope of this invention, the cis to trans ratio can be adjusted by increasing or decreasing the amount of isoprene or cis,cis-1,3-cyclic olefin. However, with respect to the prior art polymerizations (no adjuster of this invention present) this invention always results in an increase in the cis content of the resulting polymer.

In the case of high-molecular weight products, an increase in the addition of the 1,3-diene compounds according to this invention likewise results in a reduction in the trans-double bond contents, i.e., crystallinity and concomitantly therewith melting temperatures are reduced. This again provides convenient means for the mentioned adjustment.

The reaction can be conducted in all solvents known to be suitable in polymerization with the aid of Ziegler-Natta catalysts. The most important representatives from the group of aliphatic, alicyclic, aromatic, and halogenated hydrocarbons are the following: pentane, hexane, heptane, n- and iso-octane, isononane (hydrogenated trimer propene), n-decane, isododecane (hydrogenated tetramer propene), cyclopentane, cyclohexane, methylcyclopentane, methylcyclohexane, ethylcyclohexane, isopropylcyclohexane, cyclooctane, decahydronaphthalene, hydrogenated terpenes, such as pinane and camphane, cyclohexene and its substitution products, benzene, toluene, o-, m-, p-xylene, ethylbenzene, o-, m-, p-diethylbenzene, n-propylbenzene, isopropylbenzene and other mono- to polyalkylbenzenes, tetrahydronaphthalene, methylene chloride, chloroform, carbon tetrachloride, 1,2-dichloroethylene, trichloroethylene, tetrachloroethylene, chlorobenzene, o-dichlorobenzene, trichlorobenzene (mixture of isomers), bromobenzene, fluorobenzene, 1,2-dichloroethane.

An essential aspect is to use the solvents, by means of suitable purification, maximally free of water (substantially anhydrous) and other H-acidic compounds, as well as compounds having donor functions (Lewis bases). Except for very small amounts optionally added to obtain specific effects, such impurities will generally impair catalyst activity.

The process of this invention is performed at temperatures of $-50°$ to $+80°$ C. The reaction temperature herein is limited in the upward direction by the thermal stability of the catalyst and in the downward direction by an excessively reduced-reaction velocity. The process is advantageously conducted at temperatures of $-30°$ to $+60°$ C., but preferably in the range of $0°$ to $+50°$ C. that can be realized with special ease. Typical reaction times are 5 to 60 minutes.

The molecular weights of the polyalkenamers producible according to the process of this invention can be adjusted within broad limits by addition of open-chain—selectively also functionally substituted—olefins in accordance with the methods cited hereinabove. It is thereby possible to manufacture elastomeric products of high Mooney viscosity which can be extended with a large amount of oil, as well as to produce readily processable types of elastomer. It is even possible to create low-viscosity, highly tacky products, or even syrupy to oily fluids.

The quantity of modifier necessary for obtaining a specific consistency depends naturally on the type of respective monomer, on the type of modifier, on the catalyst employed and on the remaining polymerization conditions. The required amounts, which can be up to 50 mole percent based on the monomer(s) utilized, can readily be determined by a few preliminary experiments.

In general, the procedure during production of the polyalkenamers of this invention comprises providing the starting monomers (monomer mixtures) including 1,3-diolefin together with the modifier in the solvent, adding the individual catalyst components, and performing the polymerization under agitation and optionally with removal of heat of reaction. The polymerization can, of course, also be conducted in partial steps, i.e., monomers, modifiers, and catalyst components can be repeatedly replenished in metered amounts.

The process of this invention can also be utilized for the manufacture of block copolymers. In this case, in a first stage, for example cyclooctene, 1,5-cyclooctadiene, cyclododecene, or similar compounds are conventionally subjected to metathetic polymerization. After completing this reaction at a respectively desired point in time, the procedure is continued as set out above in accordance with this invention.

Once the desired or attainable conversion has been achieved, the catalyst is deactivated by addition of an alcohol, such as, for example, methanol, or another H-acidic compound. Then the polymer containing phase is washed with an aqueous, aqueous-alcoholic or alcoholic solution of agents exerting a dissolving effect on the catalyst residues which latter are initially present as alcoholates or compounds of the H-acidic materials. Such compounds having a dissolving action are, for example, acids, alkaline solutions, or complex-forming compounds, such as citric or tartaric acid, methanolic potassium hydroxide solution, acetylacetone, ethylenediamine-tetraacetic acid, and nitrilotriacetic acid. Thereafter, the polymers are separated by precipitation, for example by pouring into a precipitant, such as for example, methanol or isopropanol, or by removing the solvent by distillation, e.g., by blowing in steam or by passing the polymer solution through nozzles into hot water.

In order to offer protection against oxidation, gelling and other aging phenomena, stabilizers, for example from the group of aromatic amines or sterically hindered phenols, can be admixed to the polyalkenamers of this invention in various processing stages. It is likewise possible, if necessary, to effect further purification of the polymers by reprecipitation. After these operations, the polymers are dried as is conventional, for example in a vacuum drying cabinet or by means of a rotary evaporator.

The process of this invention makes it possible to manufacture polyalkenamers exhibiting low-temperature impact resistance in an unexpectedly high yield. As compared with the prior art methods, the yield can be more than doubled. This result was even less expected inasmuch as the 1,3-dienes to be used according to this invention are known to be catalyst poisons for metathetic polymerizations.

Without further elaboration it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight, unless otherwise indicated.

In the Examples below, the following terms are written as the abbreviations appearing below:

cis,cis-Cyclooctadiene=COD
Ethyl=Et
Isobutyl=iBu
Allyltribromophenyl ether=ATBPE
Double bond(s)=DB
Iodine number [g iodine/100 g compound]=IN
Number-average molecular weight (determined by vapor pressure osmosis)=$\overline{M}_n$
Infrared=IR
Ultraviolet=UV
Nuclear magnetic resonance=NMR
Cyclopentadiene=CPD
Cyclohexadiene=CHxD
Cycloheptatriene=CHT
Cyclododecadiene=CDD
Relative solution viscosity=I
Stabilizer BKF=2,2'-methylenebis(6-tert-butyl-4-methylphenol)

EXAMPLE 1

In a 2-liter glass reactor with face-ground lid, equipped with agitator, thermal probe, dropping funnel, as well as feed and discharge conduits for protective gas, 500 ml of hexane, 108 g of 1,5-COD, 10.8 g of 1,3-COD and 11.2 g of 1-octene (10 mol-% based on 1,5-COD) were combined under dry argon with 1 mmol of $WCl_6$ (in the form of a 0.1-molar solution in chlorobenzene), 1 mmol of EtOH (in the form of a 0.1-molar solution in chlorobenzene) and 6 mmol of $EtAlCl_2$ (in the form of a 1-molar solution in chlorobenzene), and the mixture was polymerized for 15 minutes under agitation, the temperature rising during this step from 22° C. to 45° C. Thereafter, polymerization was stopped by adding a solution of 3 g of potassium hydroxide and 1 g of stabilizer BKF in 50 ml of methanol. The polymer was precipitated into 1.5 l of methanol and washed under agitation four times with 1 l of methanol. After removal of the volatile components under vacuum on a rotary evaporator at 70° C., 112 g of an oil was obtained having the following characteristic data:

DB Configuration [% trans/vinyl/cis] determined by IR analysis: 46/3/51.

Conjugated DB [as % octadiene/-triene] determined by UV analysis: 3.4/0.04.

$\overline{M}_n$: 1,500

EXAMPLES 2–5, COMPARATIVE EXAMPLES A AND B

The same procedure as in Example 1 was followed with Examples 2–5 as well as Comparative Examples A and B, except that in Examples 2–5 1,3-COD was replaced by other dienes of this invention with 1,3-positioned DB; in Comparative Example A no 1,3-diene was added; and in Comparative Example B a 1,4-diene was added instead of a 1,3-diene. The results are shown in Table 1.

EXAMPLES 6–12

Example 6 was performed analogously to Example 1, but using only 54 g of 1,5-COD, 5.4 g of 1,3-COD and 0.28 g of 1-octene (0.5 mol-% based on 1,5-COD). The metathetic catalyst was prepared by adding 1 mmol of $WCl_6$, 1 mmol of EtOH, 1 mmol of ATBPE and 7 mmol of $EtAlCl_2$. In Example 7, 1,3-COD was replaced by 1.7 g (5 mol-% based on 1,5-COD) of isoprene, and in Example 8 by 3.4 g (10 mol-% in correspondence with the amount of 1,3-COD in Example 6). Example 9 differs from Example 8 by adding triple the amount of catalyst.

In Examples 10 and 11, the amount of modifier is increased as compared with Example 6 to 10 mol-% of 1-octene and the addition of 1,3-COD is increased to 50 mol-% (respectively based on 1,5-COD). In Example 12, the proportion of 1,3-COD has again been increased, now being 100 mol-%, with an amount of modifier of 20 mol-% of 1-octene (in each case based on 1,5-COD). Furthermore, double the catalyst quantity was used for Examples 11 and 12 as compared with Example 6.

The results are compiled in Table 2.

TABLE 2

Polymerization of 1,5-COD (54 g = 0.5 mol) in Hexane (500 ml) with Different Amounts of Modifier and 1,5-COD/W Ratios, Adding Various 1,3-Dienes

| Example No. | Diene Type | Diene Amount [mol %] | Modifier 1-Octene [mol %] | Monomer Catalyst Ratio [mol 1,5-COD/mol W] | Yield [g] | DB-Configuration trans/vinyl/cis | I [ml/g]/ Gel [%] | Conjugated DB [% Diene/Triene] |
|---|---|---|---|---|---|---|---|---|
| 6 | 1,3-COD | 10 | 0.5 | 500 | 45 | 58/1/41 | 46/2 | 3.9/0.09 |
| 7 | Isoprene | 5 | 0.5 | 500 | 44 | 58/1/41 | 26/3 | 0.36/0.01 |
| 8 | Isoprene | 10 | 0.5 | 500 | 11 | 21/1/78 | 12/8 | 0.33/0.01 |
| 9 | Isoprene | 10 | 0.5 | 167 | 44 | 73/2/25 | 15/3 | 0.18/0.01 |
| 10 | 1,3-COD | 50 | 10 | 500 | 6 | 23/2/75 | —/— | 10.8/0.19 |
| 11 | 1,3-COD | 50 | 10 | 250 | 51 | 37/3/60 | <10/<2 | 12.0/0.55 |
| 12 | 1,3-COD | 100 | 20 | 250 | 50 | 34/6/62 | <10/<2 | 20.2/1.3 |

EXAMPLE 13

In a 2-liter glass reactor, equipped as set forth in Example 1, chlorobenzene (250 ml) was combined with 0.5 mmol of $WCl_6$, 0.5 mmol of EtOH and 3 mmol of $EtAlCl_2$ in form of the solutions described in Example 1; a mixture of 48 g of 2-norbornene, 2.7 g of 1,3-COD (5 mol-% based on norbornene) and 5.6 g of 1-octene (10 mol-% based on norbornene) was added and the mixture was polymerized under agitation. After 10 minutes, the mixture was diluted with 250 ml of chlorobenzene and, after 30 minutes, the reaction was stopped as described in Example 1 and the product worked up, resulting in 48 g of polymer having the following characteristic data:

DB Configuration [% trans/vinyl/cis] determined by IR analysis: 45/1/54.

TABLE 1

Polymerization of 1,5-COD (108 g = 1 mol) in Hexane (500 ml) Modified with mol % 1-Octene and with a 1,5-COD/W ratio of 1,000/1, Adding Various 1,3-Dienes

| Example No. | Diene Type | Diene Amount [mol %] | Yield [g] | DB Configuration trans/vinyl/cis | $\overline{M}_n$ | Conjugated DB [% Diene/Triene] |
|---|---|---|---|---|---|---|
| 2 | 1,3-CDD | 10 | 118 | 64/3/33 | 1610 | 2.47/0.04 |
| 3 | 1,3-CHxD | 10 | 119 | 60/4/37 | 1410 | 0.21/0.01 |
| 4 | 1,3-CPD | 10 | 90 | 41/1/58 | Contains Gel | 0.27/0.01 |
| 5 | 1,3,5-CHT | 10 | 106 | 63/4/33 | 1250 | 0.06/0.01 |
| A | — | — | 106 | 84/2/14 | 3500 | 0.17/0.01 |
| B | 1,4-CHxD | 10 | 108 | 82/1/17 | 1540 | 0.23/0.01 |

Conjugated DB [as % octadiene/-triene] determined by UV analysis: 0.69.
I [ml/g]: 32
Gel [%]: 2

COMPARATIVE EXAMPLE C

This example corresponds to Example 13, but no 1,3-COD was added. The result was 48 g of polymer having the following characteristics:

DB Configuration [% trans/vinyl/cis] determined by IR analysis: 82/5/13.

Conjugated DB [as % octadiene/-triene] determined by UV analysis: 0.05.
I [ml/g]: 11
Gel [%]: 3

EXAMPLE 14

In a 2-liter glass reactor, equipped as disclosed in Example 1, 300 ml of chlorobenzene, 55 g of cyclooctene, 54 g of 1,5-COD, 8.1 g of 1,3-COD (15 mol-% based on 1,5-COD), and 0.45 g of 1-octene (0.4 mol-% based on the sum total of cyclooctene and 1,5-COD) were combined with 0.5 mmol of $WCl_6$, 0.5 mmol of EtOH, 0.5 mmol of ATBPE (respectively 0.1-molar solutions in chlorobenzene), and 3.5 mmol of $iBuAlCl_2$ (1-molar solution in chlorobenzene), and the mixture was polymerized under agitation. The temperature rose rapidly from 22° C. to 54° C. with a great increase in viscosity, and the reaction mixture was diluted with 200 ml of chlorobenzene. After 15 minutes, polymerization was stopped as described in Example 1 and the product worked up, resulting in 104 g of a polymer having the following characteristic data:

DB Configuration [% trans/vinyl/cis] determined by IR analysis: 32/<1/68.
I [ml/g]: 115
Gel [%]: 2
IN: 335

No melting point or range, respectively, could be found in the rubbery product by means of differential thermal analysis (DTA).

EXAMPLE 15

This example corresponds to Example 14 with the difference that 77 g of cyclooctene, 32.4 g of 1,5-COD, and 5.4 g of 1,3-COD (17 mol-% based on 1,5-COD) were utilized in addition to 0.45 g of 1-octene. The result was 99 g of polymer having the following characteristics:

DB Configuration [% trans/vinyl/cis] determined by IR analysis: 47/<1/53.
I [ml/g]: 153
Gel [%]: 3
IN: 295

EXAMPLE 16

In a 2-liter glass reactor, equipped as disclosed in Example 1, 600 ml of hexane, 66 g (0.6 mol) of cyclooctene, and 0.54 g of 1-octene (0.8 mol-% based on cyclooctene) were combined, in a first stage, with 1.2 mmol of $WCl_6$, 1.2 mmol of EtOH, 1.2 mmol of ATBPE (respectively 0.1-molar solutions in chlorobenzene), and 8.4 mmol of $iBuAlCl_2$ (1-molar solution in chlorobenzene), and polymerized for 15 minutes under agitation. Then one-sixth of the reaction solution was removed from the reactor and this sample was worked up separately, but in correspondence with the final product from the second stage.

In the second stage, a mixture of 54 g (0.5 mol) of 1,5-COD and 5.4 g (10 mol-% based on 1,5-COD) of 1,3-COD was added. The viscosity of the polymerization charge thereupon rose to such an extent that dilution with respectively 500 ml of hexane was effected directly thereafter and after 10 minutes. After 15 minutes, polymerization was stopped by adding a solution of 5 g of KOH and 1 g of stabilizer BKF in 100 ml of methanol; the product was precipitated into 1.5 l of methanol, dissolved in 500 ml of toluene, again precipitated into 1.5 l of methanol, and washed twice under agitation with respectively 1 liter of methanol. The precipitation methanol as well as the washing methanol contained in each case 1 g of stabilizer BKF. After drying in a vacuum drying cabinet at 70° C., 95 g of polymer was obtained. The sample from the first stage yielded 9.9 g of polyoctenamer. The characteristics of both products are compiled in Table 3.

COMPARATIVE EXAMPLE D

This example was conducted corresponding to Example 16, with the difference that only 1,5-COD and no 1,3-COD was added in the second stage of the polymerization. Yields and characteristics are contained in Table 3.

EXAMPLE 17 AND COMPARATIVE EXAMPLE E

These examples correspond to Example 16 and Comparative Example D, respectively, except that, in the first stage, 64.8 g of 1,5-COD was used instead of cyclooctene, and, in the second stage, 500 ml of hexane to lower viscosity was added to the reaction mixture only once (after an operating period of 5 minutes). Yield and characteristic data for both products can be seen from Table 3.

TABLE 3

Stepwise Polymerization of Cycloolefins

| Ex. | Stage | Cycloolefin I Type | Qty. [mol] | Separated Sample Qty. [mol] | Yield [g] | Cycloolefin II Type | Qty. [mol] | 1,3-Diene Type | Qty. Based on II [mol %] | Yield [g] | $DB^a$ Config. tr/vi/cis | Conj.$^b$ DB Diene/Triene | I [ml/g]/ Gel [%] | IN |
|---|---|---|---|---|---|---|---|---|---|---|---|---|---|---|
| 16 | I | Cyclo-octene | 0.6 | 0.1 | 9.9 | | | | | | 81/<1/19 | | 44/2 | |
| | II | | | | | 1,5-COD | 0.5 | 1,3-COD | 10 | 95 | 73/<1/27 | 1.6/0.02 | 80/2 | 333 |
| D | I | Cyclo-octene | 0.6 | 0.1 | 9.3 | | | | | | 83/<1/17 | | 43/<2 | |
| | II | | | | | 1,5-COD | 0.5 | 1,3-COD | — | 90 | 86/<1/14 | <0.08/— | 71/2 | 338 |
| 17 | I | 1,5-COD | 0.6 | 0.1 | 8.8 | | | | | | 88/1/11 | | 28/<2 | |

TABLE 3-continued

Stepwise Polymerization of Cycloolefins

| Ex. | Stage | Cycloolefin I Type | Qty. [mol] | Separated Sample Qty. [mol] | Yield [g] | Cycloolefin II Type | Qty. [mol] | 1,3-Diene Type | Qty. Based on II [mol %] | Yield [g] | DB[a] Config. tr/vi/cis | Conj.[b] DB Diene/Triene | I [ml/g]/ Gel [%] | IN |
|---|---|---|---|---|---|---|---|---|---|---|---|---|---|---|
|  | II |  |  |  |  | 1,5-COD | 0.5 | 1,3-COD | 10 | 87 | 71/<1/29 | 1.5/0.02 | 57/<2 | 447 |
| E | I | 1,5-COD | 0.6 | 0.1 | 9.2 |  |  |  |  |  | 89/1/10 |  | 29/<2 |  |
|  | II |  |  |  |  | 1,5-COD | 0.5 | 1,3-COD | — | 92 | 84/<1/16 | <0.07/— | 56/<2 | 446 |

[a]DB Configuration [% trans/vinyl/cis] determined by IR analysis.
[b]Conjugated DB [as % octadiene/-triene] determined by UV analysis.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

We claim:

1. In a process for producing polyalkenamers produced by ring-opening polymerization of cis,cis-1,5-cyclooctadiene in the presence of a ring-opening polymerization catalyst, the improvement comprising:
   conducting the polymerization in the presence of 0.1 to 150 mol%, in relation to the cis,cis-1,5-cyclooctadiene, of a cyclic olefin with double bonds in the 1,3-position, whereby the proportion of cis double bonds in the polyalkenamer is increased.

2. A process according to claim 1, further comprising:
   replacing a portion of the cis,cis-1,5-cyclooctadiene by a cyclic monoolefin of 7–12 carbon atoms.

3. A process according to claim 2, further comprising:
   replacing up to 80 mol% of the cis,cis-1,5-cyclooctadiene by a cyclic monoolefin.

4. A process according to claim 1 wherein said cyclic olefin with a double-bond pair in the 1,3-position, is 1,3-cyclopentadiene, 1,3-cyclohexadiene, 1,3-cyclooctadiene, 1,3,5,7-cyclooctatetraene, 1,3,5-cycloheptatriene, or 1,3-cyclododecadiene.

5. A process according to claim 3, further comprising:
   replacing up to 60 mol% of the cis,cis-1,5-cyclooctadiene by a cyclic monoolefin.

6. A process according to claim 1, further comprising conducting the polymerization in the presence of an open chain monoolefin molecular weight modifier.

7. A process according to claim 1, wherein the amount of cyclic 1,3-diolefin is 3–20 mol%.

8. A process ac to claim 1, wherein the amount of cyclic 1,3-diolefin 0.1–100 is mol%.

9. A process according to claim 1, wherein the amount of cyclic 1,3-diolefin is 3–100 mol%.

10. A process according to claim 1, further comprising:
    performing the polymerization at a temperature of −50° C. to 80° C.

11. A process according to claim 1, further comprising:
    performing the polymerization at a temperature of −30° to 60° C.

12. A process according to claim 1, further comprising:
    performing the polymerization at a temperature of 0° to 50° C.

13. A process of claim 1, wherein the polyalkenamer a block copolymer.

14. A polyalkenamer prepared by the process of claim 1.

* * * * *